United States Patent [19]

McConnell

[11] 4,423,839

[45] Jan. 3, 1984

[54] ALIGNMENT CONTROL SYSTEM FOR LATERAL IRRIGATORS

[76] Inventor: James R. McConnell, 650 Ford St., Colorado Springs, Colo. 80915

[21] Appl. No.: 351,022

[22] Filed: Feb. 22, 1982

[51] Int. Cl.³ ............................................... B05B 3/18
[52] U.S. Cl. ......................................... 239/1; 239/720
[58] Field of Search ................................... 239/720, 1

[56] References Cited

U.S. PATENT DOCUMENTS

| | | |
|---|---|---|
| 3,587,763 | 6/1971 | Kinkead. |
| 3,712,544 | 3/1971 | Ririe et al.. |
| 3,974,845 | 8/1976 | Indresaeter. |
| 4,085,771 | 4/1978 | Hunter ............................ 239/720 X |

*Primary Examiner*—John J. Love
*Assistant Examiner*—Mary McCarthy
*Attorney, Agent, or Firm*—W. Scott Carson

[57] ABSTRACT

An alignment control system for lateral irrigators. The alignment control system includes a dampening feature which monitors changes in the lateral displacement of the master and wing of the irrigator relative to each other and based thereon, operates the irrigator to dampen not only the lead-lag oscillations of the wing relative to the master but also the left-wing oscillations of the master about its preferred line of travel. A zero thrust expansion joint is also disclosed which enables the lateral displacement measurements at the joint to be independent of the force of the water pressure in the irrigator tending to push the master and wing apart. The zero thrust expansion joint includes a flexible member whose sides match the cross-sectional area of the pipes of the irrigator. The interior of the flexible member is in fluid communication with the water in the pipes and each side of the flexible member is attached to respective ones of the pipes at the joint. In this manner, the force of the water pressure in the pipes tending to push them apart at the joint is neutralized or isolated so that the sensors only measure lateral displacements due to forces other than the force of the water pressure within the pipes tending to push them apart. In another embodiment of the invention, the pipes are attached together by a relatively tight joint restricting lateral displacement of the pipes relative to each other and in this embodiment, a strain gauge arrangement is used to measure the forces tending to laterally displace the pipes rather than actual, physical displacements of the pipes relative to each other as in the other embodiments.

30 Claims, 15 Drawing Figures

ALIGNMENT CONTROL SYSTEM FOR LATERAL IRRIGATORS

FIELD OF INVENTION

This invention relates to the field of alignment controls for lateral irrigators.

BACKGROUND OF THE INVENTION AND PRIOR ART

Lateral irrigators such as U.S. Pat. No. 3,974,845 to Indresaeter are largely an outgrowth of center-pivot irrigators such as U.S. Pat. No. 2,893,643 to Gordon. As between the two, the primary difference is that lateral irrigators are designed to traverse the field while center-pivot irrigators are designed to rotate about a fixed point. Although much of the fundamental technology developed for center-pivot irrigators is readily adaptable to lateral irrigators (e.g., power drives), lateral irrigators do present several new and unique problems for which no solution can be found in the technology of center-pivot irrigators.

One of these new problems is how to maintain the water receiving end of the lateral irrigator closely adjacent to the water supply which is typically a linearly extending open ditch (see U.S. Pat. No. 3,707,164 to Clemons and U.S. Pat. No. 3,726,478 to McMurray) or pipe (see U.S. Pat. No. 3,587,763 to Kinkead and U.S. Pat. No. 3,613,703 to Stout). Such linearly extending water supplies and the problems created thereby are not present in center-pivot irrigators. Specifically, in center-pivot irrigators (see U.S. Pat. No 2,893,643 to Gordon and U.S. Pat. Nos. 4,161,185 and 4,262,694 to McConnell), the inner or water receiving end is securely mounted at a fixed point or center about which the irrigator rotates. Consequently, the water can rather easily be delivered to the inner or water receiving end of the center-pivot irrigator through a buried pipe. In contrast, lateral irrigators from the outset present the initial problem of establishing a reference or guidance system whereby the water receiving end of the irrigator can follow the path of the water supply (which typically is linear but can be otherwise). For the most part, this initial problem has been successfully solved. For example, common methods of doing this with various water supply arangements (e.g., open ditches, pipes) are illustrated by U.S. Pat. Nos. 3,707,164 and 3,726,478 which have members that engage one or more of the sides of an open water ditch, U.S. Pat. No. 3,587,763 which has a guide roller physically engaging the exterior of a water pipe, and U.S. Pat. No. 3,974,485 to Indresaeter and U.S. Pat. No. 4,190,068 to Beusch which follow a guide wire extending immediately adjacent the path of the water supply. Additionally, displacement arrangements such as those illustrated in FIGS. 2 and 4 of U.S. Pat. No. 3,712,544 displacement arrangements can be easily adapted to detect and in FIGS. 2-5 of U.S. Pat. No. 3,780,947 to Ririe of a lateral irrigator from a guide wire.

A second problem presented by lateral irrigators that has no true counterpart in center-pivot technology is how to correct any misalignments or deviations of the lateral irrigator from its preferred relationship with the water supply. In most cases, this preferred relationship is with the water receiving end portion or master of the irrigator (which typically carries the power source and pump for the irrigator) at a predetermined distance (e.g., three feet) from the water supply (see FIG. 12 of U.S. Pat. No. 3,974,845) and with the rest of the irrigator or wing extending at a right angle to the water supply (see FIG. 1 of U.S. Pat. No. 3,974,845). By keeping the wing of the irrigator at a right angle to the water supply, it neither lags behind the perpendicular (which in extreme cases can actually physically pull the irrigator off line and away from the water supply) nor leads the perpendicular (which in extreme cases can actually physically push the irrigator off line and toward the water supply). Understandably, under ideal conditions in which the water supply is linearly extending and the advancing lateral irrigator maintains its preferred position with the master at the desired distance from the water supply and the wing substantially perpendicular to the water supply, the problem of correcting misalignments may never present itself. However, in practice, the need to make corrections more often than not arises every time the lateral irrigator is used. Further, if not corrected and the misalignments or deviations are allowed to increase, the result can be devistating leading not only to a failure of the system to irrigate the field properly but also often to major structural damage to the irrigtor itself.

Rather than solving the problems of the master deviating from its desired distance from the water supply and the wing deviating from its desired perpendicular, most systems merely try to make the problems manageable by allowing these deviations to become regular within acceptable limits of frequency and amplitude (see FIGS. 4 and 5 of U.S. Pat. No. 3,974,845 to Indresaeter, FIG. 1 of U.S. Pat. No. 3,613,703, and FIG. 6 of U.S. Pat. No. 4,190,068). However, as recognized by Indresaeter in FIGS. 6-8, it is preferable to have the master travel in as straight a manner as possible and to correct any deviations as they occur. This not only results in better water application but also reduces stress and strain on the irrigator itself caused by the alternately applied tensile and compressive forces accompanying the oscillating operation of FIGS. 4-5 of the Indresaeter patent.

Although Indresaeter disclosed several methods for dampening the oscillations of the master about the ideal track, he suggests no procedure for dampening the lead-lag oscillations of the wing. Further, all of the dampening procedures of Indresaeter rely primarily upon sensing angle changes which is a most imprecise technique at best considering that the angle changes that must be measured can be on the order of fractions of 1° and the distances over which such measurements are taken can be on the order of a quarter mile or more. This is not to mention the errors that may be introduced due to wind, bumps that may jolt the sensors, temperature changes that may effect the tolerances of the operating parts of the sensors, and damage to the system that may occur with normal wear and tear which may offset the sensor settings. This is also not to mention the sophistication required of the sensing apparatuses, their cost, or their delicacy. An additional drawback in the dampening methods of Indresaeter for the master is that these methods require the ends of the irrigator to alternately stop and act as a pivot point while the other end advances. Such manuevers result in irregular watering patterns and in the case of the embodiments of his FIGS. 7-8, the frequent stopping and starting of the tower drives can be quite harmful to them and significantly reduce their operating lives.

It was with the shortcomings and drawbacks of the devices discussed above in mind that the present invention was developed. With the alignment control system of the present invention, deviations of the lateral irrigator from its preferred relationship to the water supply with the master a given distance from the water supply and the wing perpendicular to it can be easily and quickly corrected with a minimum of complexity not only in the manner that the deviations are sensed but also in the manner in which the irrigator is operated to correct the problem. With the alignment control of the present invention, deviations of the master from its ideal track and deviations of the wing from the perpendicular can be corrected and due to the dampening feature of the present invention, oscillations of the master and wing which are merely accepted by the prior art approaches can be gradually eliminated so that the irrigator returns to its ideal relationship to the water supply for the most efficient and effective operation.

SUMMARY OF THE INVENTION

This invention involves an alignment control system for lateral irrigators. The alignment control system includes a dampening feature which monitors changes in the lateral displacement of the master and wing of the irrigator relative to each other and based thereon, operates the irrigator to dampen not only the lead-lag oscillations of the wing relative to the master but also the left-right oscillations of the master about its preferred line of travel. A zero thrust expansion joint is also disclosed which enables the lateral displacement measurements at the joint to be independent of the force of the water pressure in the irrigator tending to push the master and wing apart. The zero thrust expansion joint includes a flexible member whose sides match the cross-sectional area of the pipes of the irrigator. The interior of the flexible member is in fluid communication with the water in the pipes and each side of the flexible member is attached to respective ones of the pipes at the joint. In this manner, the force of the water pressure in the pipes tending to push them apart at the joint is neutralized or isolated so that the sensors only measure lateral displacements due to forces other than the force of the water pressure within the pipes tending to push them apart. In another embodiment of the invention, a strain gauge arrangement is used to measure the forces tending to laterally displace the pipes rather than actual, physical displacements of the pipes relative to each other.

BRIEF DESCRIPTION OF THE DRAWINGS

FIG. 11 is a simplified, top plan view corresponding to FIG. 10 illustrating the operation of the lateral irrigator with the dampening feature. As shown in FIG. 11, the dampening feature of the present invention not only serves to dampen the lead-lag oscillations of the wing as FIG. 9 but also serves to dampen the oscillations of the master about line B'—B'.

DETAILED DESCRIPTION OF THE PREFERRED EMBODIMENTS

Figure 1:
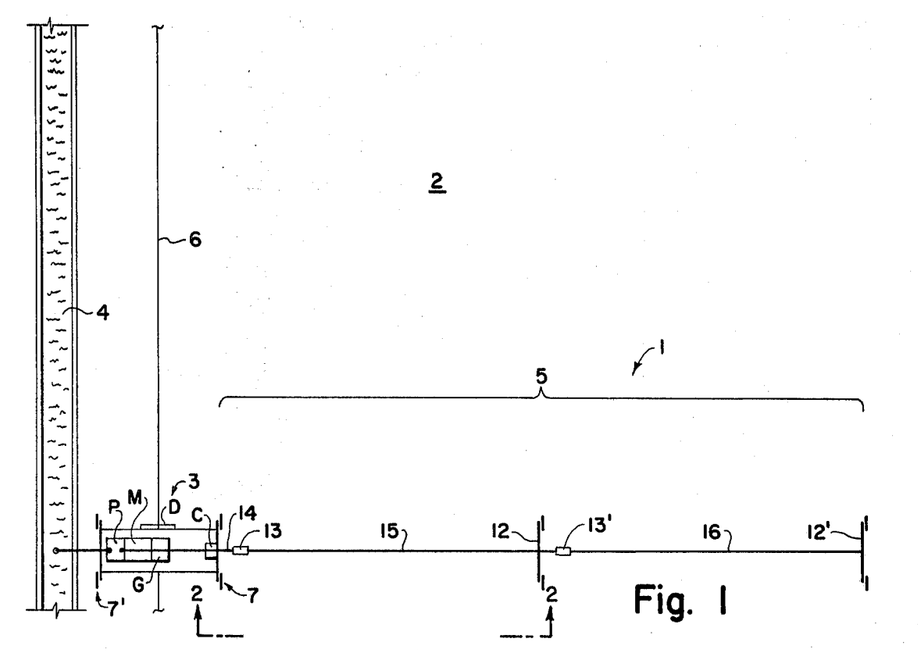
FIG. 1 is a top plan view of the lateral irrigator of the present invention shown in its preferred operating relationship to the water supply with the master spaced a predetermined distance from the water supply and the wing extending perpendicular to it.

In the preferred mode of operation as illustrated in FIG. 1, the lateral irrigator 1 of the present invention traverses the field 2 with the master 3 a predetermined distance (e.g., three feet) from the water supply 4 and with the wing 5 perpendicular to the water supply 4. The master 3 is designed to follow the guide wire 6 in a known manner wherein lateral displacements of the master 3 to the left or right of the center relative to the guide wire 6 in FIG. 1 are detected at D (e.g., as in the general manner of FIGS. 2 and 4 of U.S. Pat. No. 3,712,544 to Gering or U.S. Pat. No. 3,780,947 to Ririe). Upon such detection, the right and left sets of drive wheels 7 and 7' for the master 3 are then driven at different speeds by control C to turn the master 3 much in the manner of a tank or bulldozer and bring it back to the correct alignment relative to the guide wire 6. The set of drive wheels 7 and 7' can be made steerable in the manner of U.S. Pat. No. 4,190,068 if desired but the tank-type steering is preferred for simplicity. Referring again to FIG. 1, the master 3 carries the motor M which powers the water pump P and generator G for the electric drives 8 and 9 (see FIG. 2) to the respective wheels 10 and 11 of the master 3 and tower 12 of the wing 5.

Figure 2:
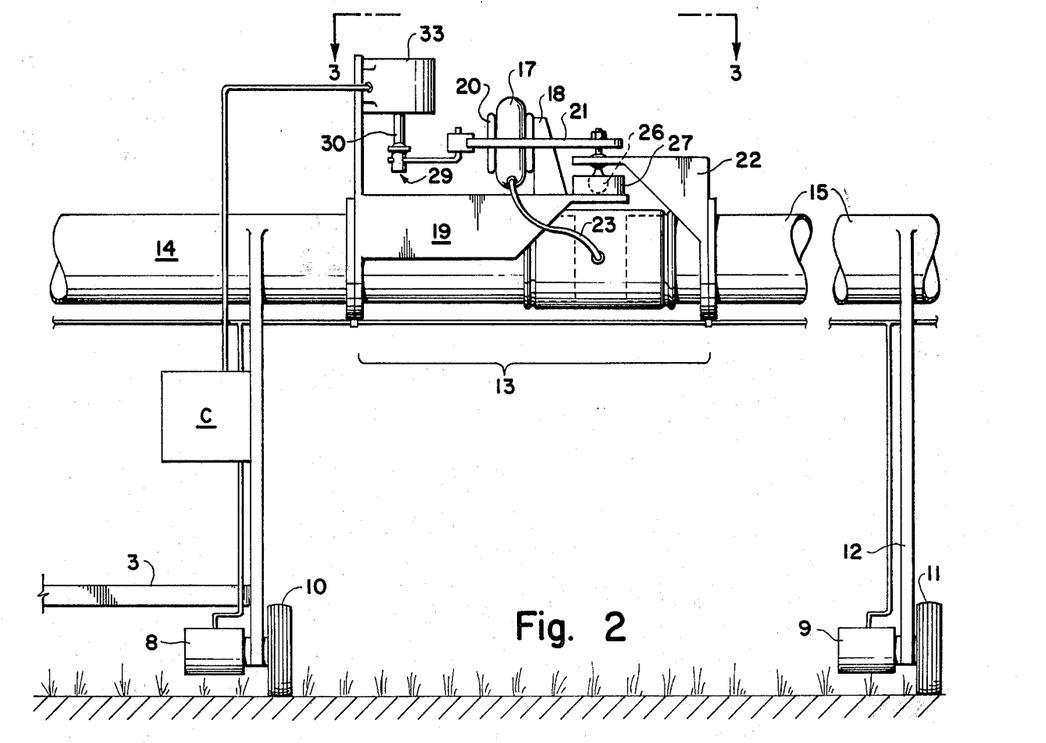
FIG. 2 is a side elevation taken along line 2—2 of FIG. 1 illustrating the zero thrust expansion joint between the pipe spans of the irrigator and also illustrating the alignment control system of the present invention which measures lateral displacement between the pipe span at the joint.
Figure 3:
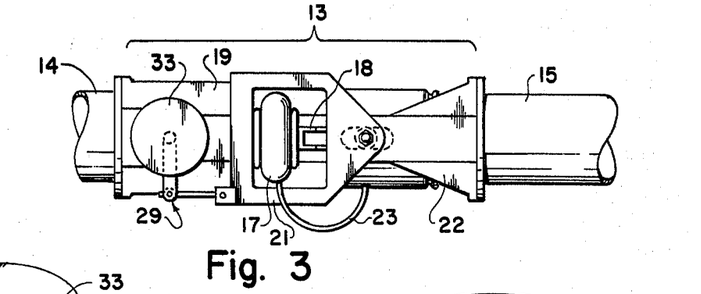
FIG. 3 is a top view taken along line 3—3 of FIG. 2 illustrating details of the zero thrust expansion joint and the alignment control system.

As illustrated in FIGS. 1-3, a zero thrust expansion joint 13 connects the water pipe 14 on the master 3 to the first pipe span 15 of the wing 5 and a second joint 13' connects the first pipe span 15 to the second pipe span 16. The zero thrust expansion joint 13 is designed to neutralize the effect of the water pressure within the pipes 14–16 which tends to telescope the pipes 14–16 apart at the joints. Specifically, the zero thrust expansion joint 13 (FIGS. 2 and 3) includes the hollow, flexible member 17 whose sides have substantially the same diameter and cross-sectional area as the pipes 14–16. The sides are substantially parallel to the cross sections of the pipes 14 and 15 at the joint 13. One side of the member 17 is mounted at 18 to the member 19 affixed to the pipe 14 while the other side is mounted at 20 to the member 21 which is connected to the member 22 affixed to the pipe span 15 (see FIG. 2). A hose member 23 places the interior of the member 17 in fluid communication with the water in the pipes 14 and 15 wherein the member 17 is placed under the identical pressure. Since the diameter of the member 17 is substantially identical to that of the pipes 14–16, the pressure in the member 17 acting against the sides of the tire member 17 equals the forces (pressure times area) in the irrigator 1 acting against its ends tending to telescope the pipes 14–16 apart at the joints 13 and 13'. In this manner, the telescoping forces are substantially instantaneously matched in the member 17 and their effect transferred from pipe 14 to pipe 15 in FIG. 2. In essence, this neutralizes the inherent telescoping forces due to the water pressure in the irrigator 1 and creates a zero thrust expansion joint at 13 in FIG. 2. With the telescoping tendency due to the force of the water pressure neutralized, the joint 13 can then be used as a basis for measuring lateral displacement of the pipes 14 and 15 that are due to forces other than the water pressure that are moving the pipes 14 and 15 toward or away from each other. Understandably, if lateral displacements of the pipes 14 and 15 are measured at the joint 13 without a neutralizing mechanism like the zero expansion joint 13 to isolate the force of the water pressure from the other forces tending to laterally displace the pipes 14 and 15, it cannot easily and readily be determined if the lateral displacements are due to misalignments or merely water pressure changes.

Figure 4:
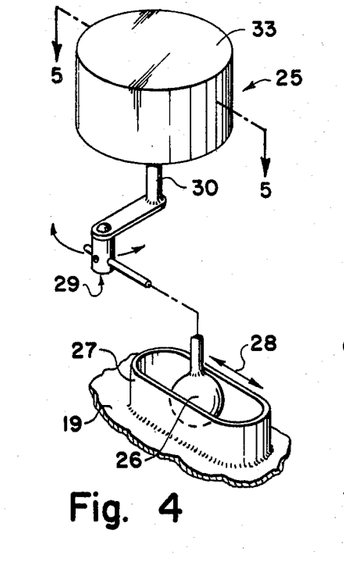
FIG. 4 is a simplified isometric view of the manner in which the lateral displacement of the pipe spans at the expansion joint activates the alignment control.
Figure 5:
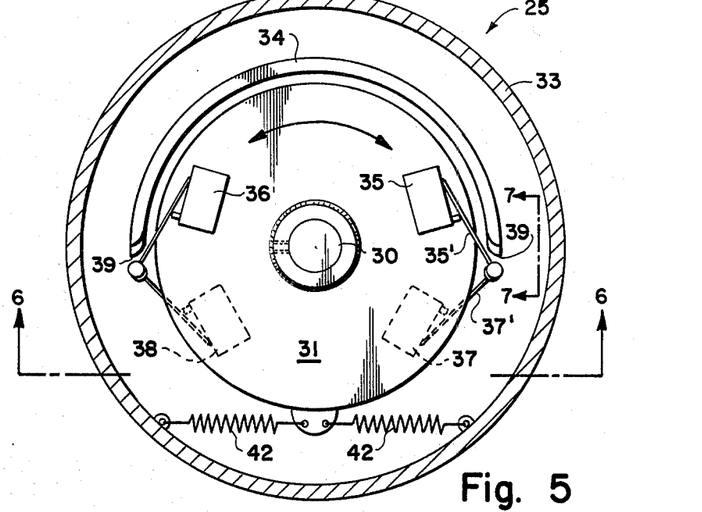
FIG. 5 is a cross-sectional view of the alignment control box taken along line 5—5 of FIG. 4.
Figure 6:
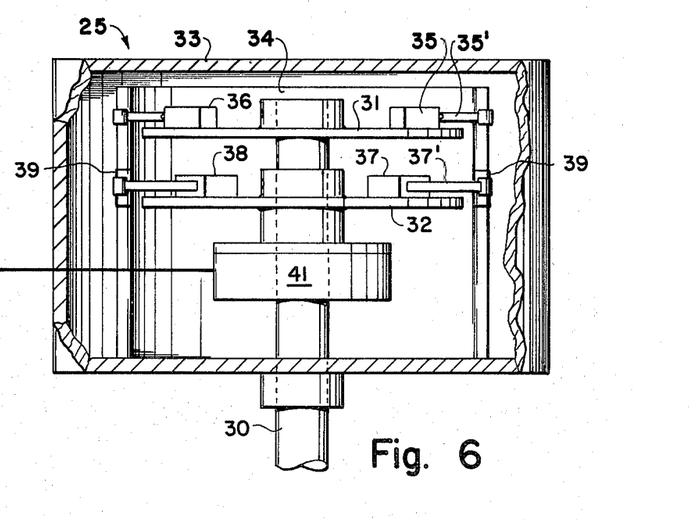
FIG. 6 is a cross-sectional view of the alignment control box taken along line 6—6 of FIG. 5.
Figure 7:
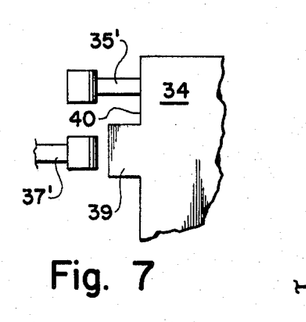
FIG. 7 is a side view taken along line 7—7 of FIG. 5 illustrating the relationship of the main drive switches and the dampening swithes to the activating cam member.

The alignment control system 25 of the lateral irrigator 1 (see FIGS. 2 and 4) includes the ball 26 and socket 27 arrangement. The ball 26 is attached to and moves with the pipe span 15 of the wing 5 and the socket 27 is attached to and moves with the pipe 14 of the master 3. As illustrated in FIG. 4, the movement of the ball 26 within the elongated socket 27 as shown by arrow 28 (which movement is caused by lateral displacement of the pipes 14 and 15 relative to each other) is sensed or detected and operates the bell crank arrangement 29 to rotate the shaft 30. Rotation of the shaft 30 in turn causes plates 31 and 32 within the control box 33 to rotate clockwise or counterclockwise about the axis of the shaft 30 as best seen in FIGS. 5 and 6. The semicylindrical cam member 34 in FIGS. 5 and 6 is fixedly attached to the control box 33 and as the shaft 30 is rotated, for example, counterclockwise in FIG. 5, the main drive switch 35 mounted on the upper plate 31 and the dampening switch 37 mounted on the lower plated 32 are activated as the respective switch arms 35' and 37' strike cam member 34. In the preferred embodiment, the dampening switch arm 37' is activated before the main drive switch arm 35' and this can be accomplished in a number of ways including the manner shown in FIG. 7 in which a detent 39 extends outwardly of the activating surface 40 for the main drive switch arm 35' on the activating cam member 34. As best seen in FIG. 6, the lower plate 32 for the dampening switches 37 and 38 is mounted to the shaft 30 by an electromagnetic clutch 41. In this manner and with the aid of centering springs 42, the lower plate 32 and dampening switches 37 and 38 can be recentered at periodic intervals to a neutral position relative to the activating cam member 34. The result of this is that the dampening switches 37 and 38 periodically sense or sample the position of the ball 26 relative to the previous sensing or sampling and if the ball 26 has moved laterally within the socket 27, one of the dampening switches 37 or 38 will be activated. The activation of either dampening switch 37 or 38 is purely in response to whether the ball 26 has moved laterally within the socket 27 since the previous sampling and is not dependent at all on where the ball 26 is within the socket 27. In contrast, the main drive switch 35 is only activated when the ball 26 is to the right of the centerline of the socket 27 in FIG. 4 and main drive switch 36 is likewise only activated when the ball 26 is to the left of the centerline of the socket 27 in FIG. 4.

Figure 8:
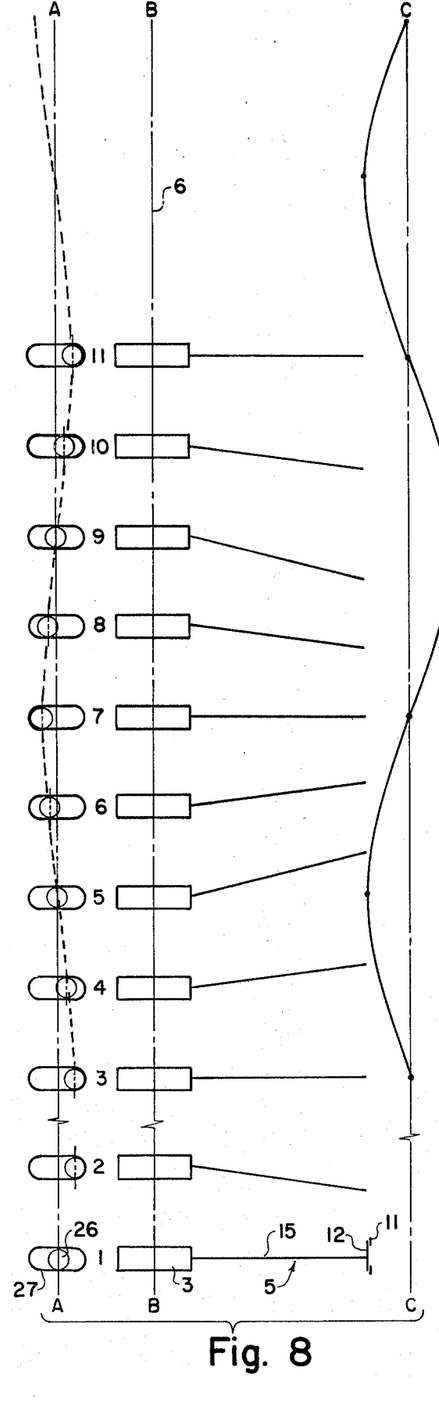
FIG. 8 is a simplified, top plan view illustrating the operation of the lateral irrigator without the dampening feature wherein the wing alternately lags and leads the master in a regular pattern as the irrigator traverses the field.

In FIGS. 8 and 9, a side-by-side comparison of the operation of the lateral irrigator 1 with and without the dampening feature is illustrated. In this example and for the sake of clarity, the wing 5 of the irrigator 1 will be assumed to have only one pipe span 15 wherein tower 12 will represent the free end of the wing 5. Referring again to FIG. 8 in which the dampening is not employed, it can be seen that once the wing 5 of the irrigator 1 deviates from its preferred perpendicular relationship to the guide wire 6 (which is parallel to the water supply 4), a regular and repeating pattern or oscillation is set up in which the wing 5 alternately leads and lags the master 3 along a perpendicular from the guide wire 6. Specifically, and referring to FIG. 8, the wing 5 is initially aligned at position 1 with the ball 26 in the middle of the socket 27 and the wing 5 on the perpendicular. As long as the irrigator 1 encounters no difficulties, this ideal relationship is maintained. However, as indicated at position 2 in FIG. 8, the wing 5 has suddenly deviated from the perpendicular as might occur, for example, if the drive wheels 11 of the tower 12 hit some wet dirt and merely spin in place. At position 2 in FIG. 8, the wing 5 lags from the perpendicular and has pulled the ball 26 to the right limit of the socket 27. This movement of the ball 26 rotates the shaft 30 and the upper plate 31 of the alignment control system 25 counterclockwise in FIG. 5 activating switch 35 (remembering that dampening switches 37 and 38 are not involved in the operational mode of FIG. 8). In the operational mode of FIG. 8, the activation of switch 35 causes the free end of the wing 5 to advance at, for example, 14 feet per minute versus a constant 10 feet per minute of the master 3. From position 2 of FIG. 8 and with the free end of the wing 5 advancing faster than the master 3, the wing 5 eventually catches up to the master 3 at position 3 but the ball 26 is still at the right limit of the socket 27. Consequently, switch 35 is still activated and the free end of the wing 5 continues at 14 feet per minute to position 4 and onto position 5 where the ball 26 is centered in the socket 27 and switch 35 is deactivated. At position 5, the deflection (lead) of the wing 5 from the perpendicular is at a maximum. At position 5, the ball 26 is centered in the socket 27 and both the master 3 and wing 5 advance at 10 feet per minute which, because of the lead of the wing 5, drives the ball 26 to the left in socket 27 (position 6) activating switch 36 to advance the free end of the wing at 6 feet per minute versus the master's 10 feet per minute until the master 3 catches up with the wing 5 at position 7. Like position 3, the wing 5 is perpendicular at position 7 but the ball 26 is off center and in the case of position 7, the ball 26 is at the left limit of socket 27. This causes the master 3 to begin to lead the wing 5 and the positions of 4-7 are correspondingly repeated at positions 8-11. Consequently, an oscillating pattern of the wing 5 is created in which it alternately leads and lags the master 3 by about ½ to 3 degrees either side of the perpendicular. The deflections of the wing 5 then follow a sine wave along axis C—C beginning at position 3 and the ball 26 follows a matching cosine wave along center line axis A—A. Axis B—B plots the centerline of the master 3 which in this example was never pulled off line.

Figure 9:
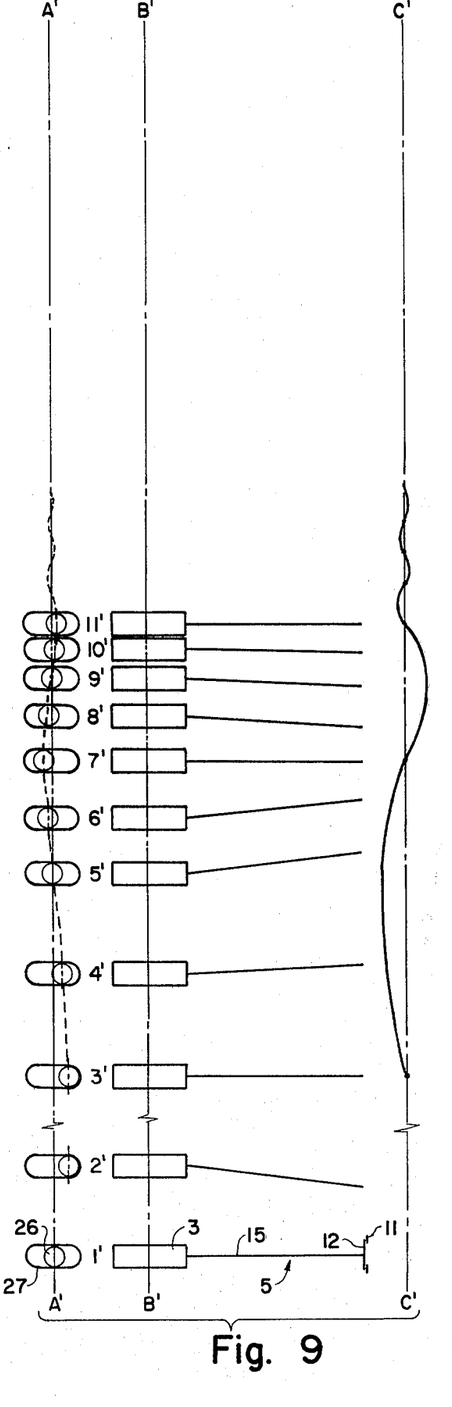
FIG. 9 is a simplified, top plan view corresponding to FIG. 8 illustrating the operation of the lateral irrigator with the dampening feature of the present invention wherein the oscillations of the wing relative to the master are dampened in comparison to the operation of FIG. 8.

In comparison, FIG. 9 illustrates the lateral irrigator 1 using the dampening feature of the present invention. In this example, the activation of switch 35 again adds 4 feet per minute to the speed of the free end of the wing 5 and activation of the dampening switch 37 adds 2 feet per minute. As in FIG. 8, the irrigator begins in position 1' of FIG. 9 with the wing 5 initially aligned perpendicular and the ball 26 in the middle of the socket 27. As long as the irrigator 1 encounters no difficulties, this ideal relationship is maintained but as in FIG. 8, the wing 5 is shown to suddenly deviate at position 2' from the perpendicular as might occur if the drive wheels 11 of the tower 12 hit some wet dirt and merely spin in place. At position 2' in FIG. 9, the wing 5 lags from the perpendicular and has pulled the ball 26 to the right limit of the socket 27. In the embodiment of FIG. 9, this movement of the ball 26 rotates plates 31 and 32 of the alignment control system 25 in FIG. 5 counterclockwise activating main drive switch 35 and dampening switch 37 to advance the free end of the wing 5 at 16 feet per minute versus the constant 10 feet per minute of the master 3. The plate 32 with the dampening switches 37 and 38 is recentered at relatively short intervals which in the example of FIG. 9 is significantly less than the distance between the positions 2' and 3'. Consequently, with the plate 32 reset, the sampling of the movement of the ball 26 within the socket 27 shortly after position 2' will show no change since the ball 26 remains to the right limit of the socket 27. The two feet per minute previously added to the speed of the free end of the wing 5 by dampening switch 37 is then deleted and the free end advances at 14 feet per minute until it reaches position 3' corresponding to position 3 of FIG. 8. In this example, the wing 5 will catch up to the master 3 and reach position 3' slightly faster than wing 5 did in FIG. 8 because during a portion of the wing's travel from position 2' to 3' it was advancing at 16 feet per minute. In any event, at position 3' in FIG. 9, the wing 5 has caught up to the master 3 as in position 3 of FIG. 8 and the free end of the wing 5 is advancing at 14 feet per minute versus the constant 10 feet per minute of the master 3. However, as the wing 5 advances past position 3' in FIG. 9 at 14 feet per minute, the ball 26 is still to the right of the center line in socket 27 activating switch 35 but the ball 26 has then moved to the left within the socket 27 representing a change in the lateral displacement of the master 3 and wing 5 corresponding to a change from tension to compression in the irrigator structure. Just past position 3', switch 35 is still to the right of center in the socket 27 and adds 4 feet per minute but the leftward movement of the ball 26 in the socket 27 causes clockwise movement of plate 32 of the alignment control system 25 in FIG. 5 activating dampening switch 38 which substracts two feet per minute. Consequently, the free end of the wing advances at 12 feet per minute toward position 4'. It is to be remembered that the electromagnetic clutch 41 and the centering springs 42 for the plate 32 in FIG. 5 are operated at intervals significantly less than the distance between position 3' and 4'. Consequently, the plate 32 is recentered frequently whereby the sensing or sampling of the movement of the ball 26 within the socket 27 will show continuous leftward movement which will quickly reactivate dampening switch 38 after each resetting so that dampening switch 38 is being activiated almost continuously. The irrigator 1 arrives at position 4' and continues to position 5' with the free end of the wing 5 advancing at 12 feet per minute (switch 35 adds 4 feet per minute and switch 38 which has been reset a number of times but due to the continuously leftward movement of the ball 26 is almost continuously activated subtracts 2 feet per minute). At position 5' in FIG. 9, the wing 5 is at maximum deflection but since the wing 5 has been advancing at 12 feet per minute versus 14 feet per minute in the undampened mode of FIG. 8, the maximum deflection in FIG. 9 is considerably less than FIG. 8 at corresponding positions 5 and 5'. At position 5' in FIG. 9, the ball 26 is in the center of the socket 27 so that neither switch 35 nor 36 is activated but because of the continuing leftward movement of the ball 26 within the socket 27, switch 38 is activated to advance the free end of the wing at 8 feet per minute enabling the master 3 to catch up at position 7' in a shorter distance than undampened position 7 in FIG. 8. Further, because the deflections of the wing 5 from positions 3' to 7' in FIG. 9 are less than in corresponding positions of undampened FIG. 8, the ball 26 at position 7' in FIG. 9 is moved to the left within socket 27 less than in corresponding position 7 of FIG. 8. In the same manner of operation as in positions 3' to 7' in FIG. 9, the deflections of the wing 5 from position 7' to 11' are lessened until the wing deflections approach axis C—C and the ball 26 movement approaches axis A—A. The deflections of the wing 5 caused by the disturbance at position 2' are thereby dampened (over, for example, 500 feet) and the irrigator 1 is returned to its ideal relationship extending perpendicular to the water supply 4, master 5, and guide wire 6 for the most efficient and effective operation. As an overview and in essence, the dampening means 32, 37, 38, 41, and 42 of FIGS. 5-7 and 9 overrides the driving means 31, 35, and 36 which without the dampening means would establish the operational mode of FIG. 8 wherein the wing 5 alternately leads and lags the substantially perpendicular reference line in an oscillating manner. Stated more simply, the dampening means 32 and 37-42 serves to dampen the oscillations initiated by the driving means 31, 35, and 36.

Figure 10:
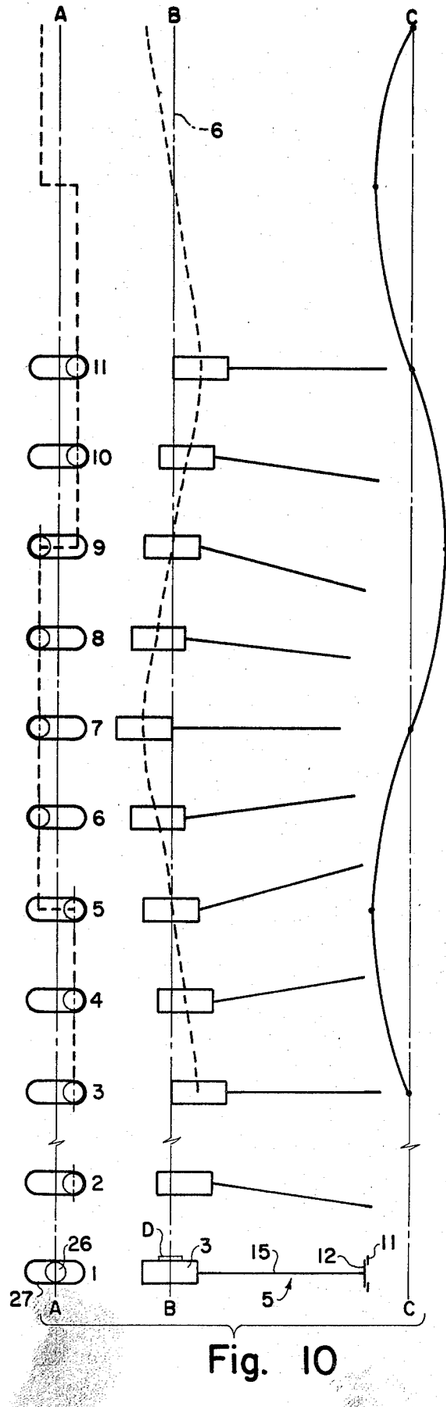
FIG. 10 is a simplified, top plan view illustrating the operation of the lateral irrigator without the dampening feature. In comparison to FIG. 8, FIG. 10 additionally shows how a lateral displacement of the wing greater than just within the limits of the socket as in FIG. 8 will also pull the master off line B—B and set up a repeating oscillation of the master about line B—B in addition to the lead-lag oscillations of the wing relative to the master.
Figure 11:
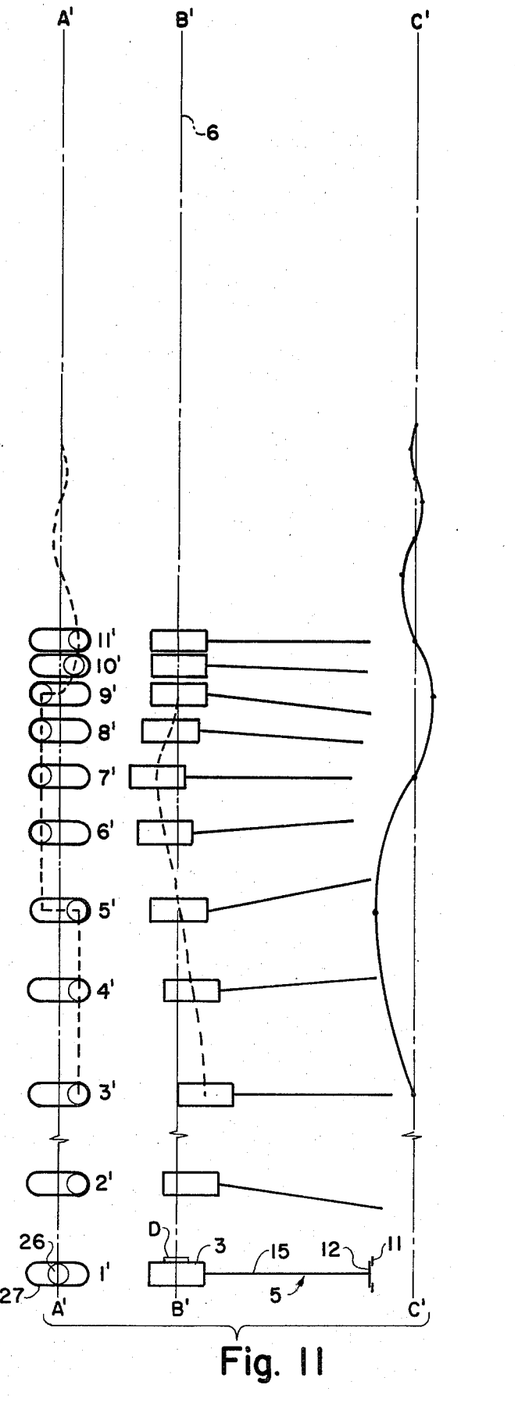

In FIGS. 10 and 11, a side-by-side comparison of the operation of the lateral irrigator 1 with and without the dampening features is illustrated. In FIGS. 10 and 11 as compared to FIGS. 8 and 9, the disturbance at positions 2 and 2' in FIGS. 10 and 11 is greater to the extent that it not only moves ball 26 to the right limit of the socket 27 but also physically pulls the master 3 off its centerline 6 (axis B—B). Referring again to FIG. 10, the irrigator 1 is initially aligned at position 1 in its ideal relationship with the ball 26 centered in the middle of the socket 27, the wing 5 on the perpendicular, and the master 3 centered about axis B—B. As long as the irrigator encounters no difficulties, this ideal relationship is maintained. However, as indicated in position 2 in FIG. 10, the wing 5 has suddenly deviated from the perpendicular as might occur, for example, if the drive wheels 11 of the tower 12 hit an obstacle that prevents their advance for some time. At position 2 in FIG. 10, the wing 5 lags the perpendicular reference line and has not only moved the ball 26 to the right limit of the socket 27 but also physically moved the master 3 off its centerline 6. This movement of the ball 26 rotates the shaft 30 and the upper plate 31 of the alignment control 25 counter-clockwise in FIG. 5 activating switch 35 (remembering that dampenings switches 37 and 38 are not involved in the operational mode of FIG. 10). In the operational mode of FIG. 10, the activation of the switch 35 causes the free end of the wing 5 to advance at, for example, 14 feet per minute versus a constant 10 feet per minute of the master 3. From position 2 of FIG. 10 and with the free end of the wing 5 advancing faster than the master 3, the wing 5 eventually catches up to the master 3 at position 3 but because the misalignment of the wing 5 was so great, the master 3 has been pulled even farther off its centerline 6. At position 3 in FIG. 10, the switch 35 is still activated and the free end of the wing 5 continues to advance at 14 feet per minute but, additionally, the lateral detector D on the master 3 (which is only shown on master 3 at position 1 for clarity) is activated producing the tank-type steering of the master 3 to the left in FIG. 10 driving it toward the centerline 6 (axis B—B). The steering maneuver of the master 3 continues at position 4 and the ball 26 remains at the outer limit of the socket 27 and continues to activate switch 35 advancing the wing 5 at 14 feet per minute until the irrigator 1 reaches position 5. At position 5, the detector D on the master 3 is centered but the wing 5 is still advancing at 14 feet per minute. Consequently, the ball 26 is almost instantaneously moved to the left limit of the socket 27 activating main drive switch 36 to advance the wing 5 at 6 feet per minute; but, the deflection of the wing 5 is so great that it physically pushes the master 3 to the left of its centerline 6 from positions 5 to 6 and onto position 7 where the master 3 and wing 5 are even but the master 3 has been pushed off line as in position 3. The positions of 4-7 are then correspondingly repeated at positions 8-11. Consequently, an oscillating pattern of the master 3 is created in which it moves left and right of the centerline 6 (axis B—B) on the order of 3 feet which produces a regular wave pattern about the axis B—B beginning at position 3. Additionally, the wing 5 alternately leads and lags the master 3 creating a sine wave along axis C—C beginning at position 3 and the ball 26 follows a step wave along the axis A—A.

In comparison, FIG. 11 illustrates the lateral irrigator 1 using the dampening feature of the present invention. In this example, the activation of switch 35 again adds 4 feet per minute to the speed of the free end of the wing 5 and activation of switch 37 adds 2 feet per minute. As in FIG. 10, the irrigator 1 begins in position 1' of FIG. 1 with the ball 26 in the middle of socket 27, the wing 5 on the perpendicular, and the master 3 centered on axis B—B. As long as the irrigator 1 encounters no difficulty, this ideal relationship is maintained but as in FIG. 10, the wing 5 is shown to suddenly deviate from the perpendicular at position 2'. At position 2' in FIG. 11, the wing 5 lags from the perpendicular and has not only moved the ball 26 to the right limit of socket 27 but also physically moved the master 3 off its centerline 6 (axis B—B). In the embodiment of FIG. 11, this movement of the ball 26 rotates plates 31 and 32 of the alignment control system 25 in FIG. 5 counterclockwise activating main drive switch 35 and dampening switch 37 to advance the free end of the wing 5 at 16 feet per minute. The plate 32 with the dampening switches 37 and 38 is recentered at relatively short intervals which in the example of FIG. 11 is significantly less than the distance between the positions 2' and 3'. Consequently, with the plate 32 reset, the sampling of the movement of the ball 26 within the socket 27 shortly after position 2' will show no change since the ball 26 remains to the right limit of the socket 27. The 2 feet per minute previously added to the speed of the free end of the wing 5 by dampening switch 37 is then deleted and the free end advances at 14 feet per minute until it reaches position 3' corresponding to position 3 of FIG. 10. In this example, the wing 5 will catch up to the master 3 and reach position 3' slightly faster than wing 5 did in FIG. 10 because during a portion of the wing's travel from position 2' to 3' it was advancing at 16 feet per minute. In any event, at position 3' in FIG. 11 the wing 5 has caught up to the master 3 as in position 3 of FIG. 10 and the free end of the wing 5 is advancing at 14 feet per minute versus the constant 10 feet per minute of the master 3. As was the case in FIG. 10, the misalignment of the wing 5 was so great that the master 3 has been pulled even farther off its center line at position 3'. As was also the case in FIG. 10, the lateral detector D for the master 3 (which is only shown on master 3 at position 1' for clarity) has been activated causing the control C to steer the master 3 to the left toward its centerline 6. Similarily as in position 3 of FIG. 10, the wing 5 of the irrigator at position 3' in FIG. 11 advances at 14 feet per minute because only the switch 35 is activated since the ball 26 has not moved relative to the socket 27 to activate either of the dampening switches 37 or 38. This condition continues and the wing advances at 14 feet per minute to position 4' and onto position 5'. At position 5, the detector D is centered with the wing 5 still advancing at 14 feet per minute. Consequently, and as was the case in FIG. 10, the ball 26 is almost instantaneously moved to the left limit of the socket 27 activating not only the main drive switch 36 but also the dampening switch 38 wherein the wing 5 advances at 4 feet per minute. Slightly passed position 5', the plate 32 will be reset and since the ball 26 has not moved relative to the socket 27, only the main drive switch 36 will be activated so that the wing 5 then advances at 6 feet per minute as in FIG. 10 until the master 3 catches up with the wing 5 at position 7'. Referring to FIG. 11, the deflection of the wing 5 at position 5' is not as great as position 5 of FIG. 10 but is still significant enough that it physically pushes the master 3 to the left of its centerline 6 from position 5' to 6' and onto position 7'. However, because the deflection at position 5' in FIG. 11 is less than the corresponding position in FIG. 10, the master 3 is not pushed as far to the left so that at position 7' in FIG. 11, there has already been some dampening of the movement of the master 3 relative to the axis B'—B'. This dampening of the master 3 from positions 3' to 7' continues from position 7' to 9' wherein the detector D of the master 3 is no longer activated and the lateral displacement of the wing 5 relative to the master 3 is now within the limits of the socket 27 as illustrated at position 11' in FIG. 11. At position 11', the master 3 is already back on its centerline 6 and the lateral displacement of the wing 5 from the master 3 is only enough to bring the ball 26 to the right limit of the socket 27. Consequently, from position 11' forward, the dampening sequence of positions 3'–11' of FIG. 9 now occur wherein the remaining deflections of the wing 5 are dampened and the irrigator 1 is returned to its ideal relationship extending perpendicular to the water supply of 4, master 5, and guide wire 6 for the most efficient and effective operation. As an overview and in essence, the dampening means 32, 37, 38, 41, and 42 of FIGS. 5–7 and 11 overrides the driving means 31, 35, and 36 which without the dampening means would establish the operational mode of FIG. 10 wherein the wing 5 alternately leads and lags the substantially perpendicular reference line in an oscillating manner and the master 3 oscillates about the axis B—B. Stated more simply, the dampening means 32, 37, 38, 41, and 42 serves to dampen the oscillations of the wing 5 and master 3 initiated by the driving means 31, 35, and 36.

Figure 12:
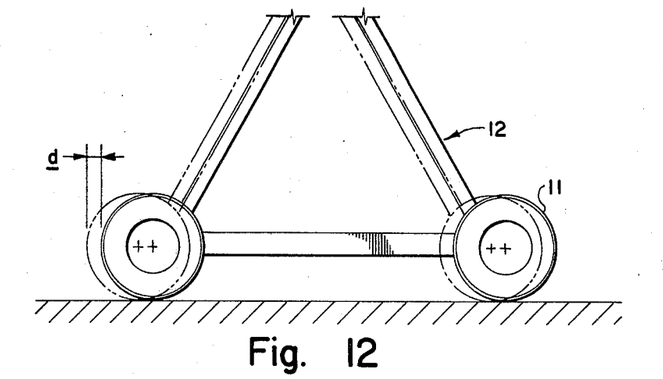
FIG. 12 is a simplified, side view illustrating the manner in which the drives for the master and towers incrementally advance.

In the preferred embodiment, the control C on the master 3 receives all inputs and drives all of the wheels 10 and 11 of the master 3 and towers 12 and 12' accordingly. However, if desired, logic circuits could be mounted on each tower or adjacent the expansion joints. In the preferred embodiment, the wheels 10 and 11 serve as metering wheels and pulse an electric current each time they have rolled a given distance d (e.g., three inches) as illustrated in FIG. 12. The speed of the preferred embodiment is controlled by the speed of the master which is preferably controlled by actual measurements of travel in a given amount of time however percent timers or variable speed motors could be used. In the preferred embodiment, the inputs to the logic circuit of control C are pulses from the metering wheels 10 and 11 and signals from the switches 35–38 of the alignment control system 25. By way of an example and assuming that the expansion joint 13 is centered, the master 3 is in line with its guidance wire 6, and the wing 5 is on the perpendicular reference line, the objective is to have both the master 3 and tower 12 of the wing 5 move equal distances (or an equal number of pulse counts) down the field 2. To achieve this, each time the master's metering wheel 10 moves a given distance (e.g., three inches), a pulse is sent to a logic panel in control C which advances a conventional "up-down" counter one count up. After six counts (which is an arbitrary figure so that the drives 8 and 9 are not constantly cycling on-off in a damaging manner) have been received by the counter, the wing drive is turned on. The metering wheels 11 of the tower 12 then send a pulse to the logic board which backs the "up-down" counter one count down. The master may have continued operating or it may have stopped but when the wing 5 and master 3 have supplied the board with an equal number of pulses, the wing 5 is stopped. The up-down counter is a conventional four bit binary integrated circuit. In one mode of operation and when the power is first turned on, the counter is initialized to 2(0010). Pulses from the master's metering wheel 10 then advances the counter up. When six pulses have been received by the counter, it will be in state 8(1000) and the output from the logic circuit in control C will start the tower drive 9. Should the master 3 be operating faster than the wing 5 (or should the wing 5 not start for some reason), the master 3 will drive the counter up to 12(1100) and at that time, another output of the logic board will not allow the master 3 to continue until the wing 5 has driven the counter back down to 2(0010). If something should go wrong and either the master 3 or the wing 5 fails to stop at its respective points, the counter will be driven to 0(0000). Should this happen, the logic circuit will "safety out" and stop the machine in a known manner. The operator is then required to shut the power off for several seconds in order to reset the counter back to 2(0010). If the field is perfectly level, the master and wing metering wheels 10 and 11 are identical in size and traveling on soil of uniform consistency, and there is no slippage of these wheels, the basic control logic will be sufficient. However, in actual use, numerous deviations from the ideal are encountered and must be corrected.

Figure 13:
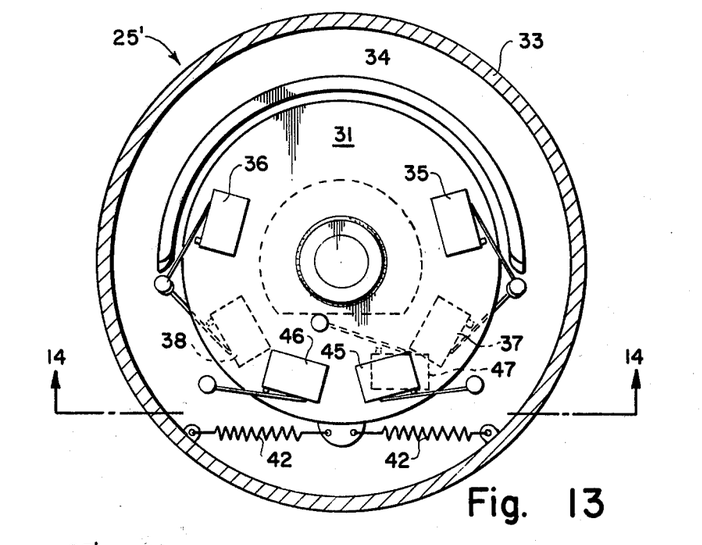
FIG. 13 is a cross-sectional view similar to FIG. 6 but illustrating a modified alignment control system in which an additional pair of main drive switches for the wing are included on the upper plate. The additional pair of switches are activated by large misalignments and serve to change the drive to the wing more drastically than in the embodiment of FIG. 6. This gives additional versatility to the alignment control system. A safety shut-down switch is also illustrated in the modified control system of FIG. 13.
Figure 14:
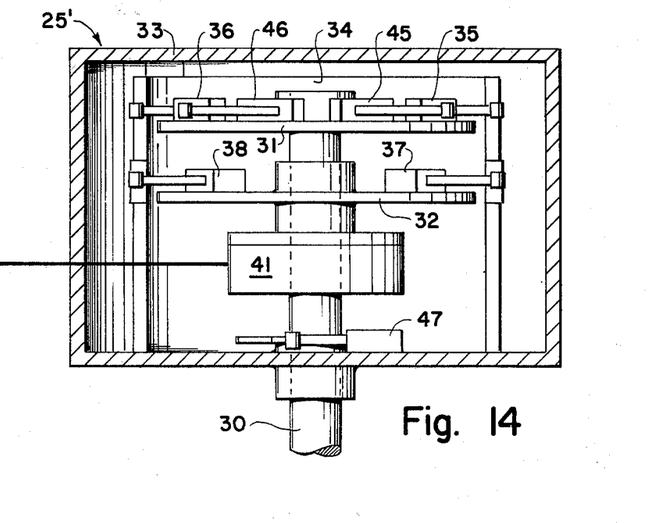
FIG. 14 is a cross-sectional view taken along line 14—14 of FIG. 13 illustrating the relationship of the switches of FIG. 13 to the activating cam member.

Before continuing with a sample explanation of a logic circuit that could be used to operate the irrigator 1, it will now be assumed that the modified alignment control 25' in FIGS. 13 and 14 is in operation. In this modified alignment control 25', an additional pair of main drive switches 45 and 46 for the wing 5 are included on the upper plate 31. This additional pair of switches 45 and 46 are activated by large misalignments and serve to change the drive to the wing 5 more drastically than the embodiment of FIG. 6. This gives additional versatility to the alignment control system as, for example, the additional operation of switches 45 and 46 could be set to add or subtract another four feet per minute in addition to the four feet per minute added or subtracted by switches 35 and 36.

Returning again to the example of the operation of a conventional logic circuit and assuming that the modified alignment control system 25' of FIGS. 13 and 14 is being used, a situation may occur wherein the wing 5 lags behind the master 3 to the extent that switches 35, 37, and 45 are activated. The wing 5 then needs to be advanced and to advance it with the switches 35, 37, and 45 operated, one pulse out of every sixteen pulses, for example, from the wing 5 could be suppressed or not allowed through to the up-down counter. This will cause the wing 5 to move 17 counts (51 inches) through the field 2 in order to back the up-down counter down 16 counts (48 inches). Consequently, the wing 5 will be advanced 51 inches for every 48 inches that the master 3 moves until the wing 5 moves laterally inward toward the master 3.

Continuing the example and assuming that the wing 5 overcorrects to the extent that switches 36, 38, and 46 are activated, one of the pulses from the master 3 will then be blanked every 16 pulses. This will cause counter to see only 15 counts for every 16 counts actually produced by the master 3. In other words, the wing 5 will only have to move 15 counts to reset the up-down counter while the master 3 really went 16 counts. The result of this is that the wing 5 is retarded three inches for every 48 inches of travel until the wing 5 again moves outwardly of the master 3. In this example, switch 35 may be set to operate upon movement of the ball 26 a quarter inch from the centerline of the socket 27 (which could be approximately three inches across) to blank a master pulse every 64 pulses or approximately 16 feet. Switch 45 could then be set to operate upon movement of the ball 26 an inch from the centerline of the socket 27 to blank out a master pulse every 16 pulses or every 4 feet. Switches 36 and 46 would then be said to operate in the corresponding manner of switches 35 and 45. The dampening switches 37 and 38, for example, could then be set to operate upon movement of the ball 26 a tenth of an inch within the socket 27 (remembering that it is movement of the ball 26 within the socket 27 that activates dampening switches 37 and 38 regardless of where the ball 26 actually is within the socket 27). In regard to recentering the plate 32 with electromagnetic clutch 41 and centering springs 42 to periodically reset the dampening switches 37 and 38, the frequency of this can be set as desired and could be, for example, set at intervals of 20 to 32 feet or 80 to 120 counts. In the examples of FIGS. 9-11, the reset distance of switches 37 and 38 is significantly less than the distance from positions 2' to 3'. As illustrated in FIGS. 8-11, the switches 37 and 38 provide the dampening and without them, the wing 5 would oscillate, alternately leading and laging the master 3 about the reference line extending perpendicular to the travel direction of the master 3 as indicated by the guide wire 6.

In the examples discussed above and illustrated in the drawings, it has been assumed that the unit 3 (master) sets the desired rate of speed of the irrigator 1 and that the tower 12 of the wing 5 (slave) follows. Obviously, the reverse would work equally as well wherein the wing 5 at tower 12 sets the desired rate of speed of irrigator 1 and what was the "master" in the above examples (i.e., unit 3) really becomes the slave. In either case, there still is an oscillating motion established in the fashion of FIGS. 8 8 and 10 in which one of the unit 3 and the wing 5 alternately leads and lags a reference line extending whichever of the unit 3 and wing 5 is the "master". In regard to the reference line of the above examples, it has been discussed as being perpendicular to the forward travel direction of the master 3 as determined by the guide wire 6. However, the reference line need not be exactly perpendicular to the forward travel direction of the master and in some cases, it is purposely set a few degrees ahead or behind the exact perpendicular wherein the reference line is substantially perpendicular; but, in any case, the oscillating motion of the slave about the reference line is still present. In actual operation, the reference line is a constantly changing one but at any instant, it is a line from the master 3 substantially perpendicular to the master's travel path as determined by the guide wire 6. Further, in the examples of FIGS. 8 and 10, the size of the deviation at position 2 is generally not critical in that almost any sized deviation will cause the irrigator 1 to assume the oscillating motion illustrated in positions 3-11 on FIGS. 8 and 10.

Figure 15:
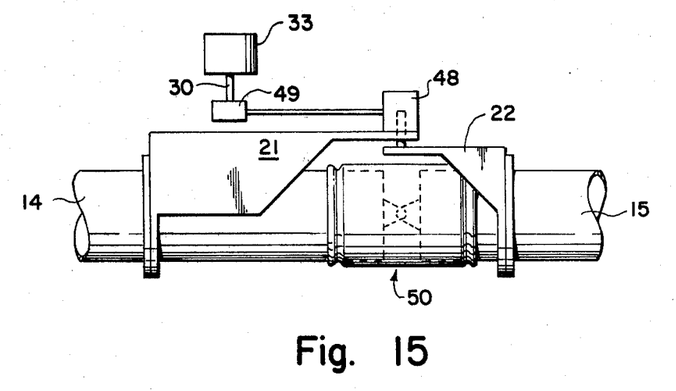
FIG. 15 illustrates a modification in which the ball and socket and bell crank arrangement for rotating the shaft of the alignment control system of FIGS. 2–4 is replaced with a strain gauge and electrical drive to rotate the shaft.

In FIG. 15, the ball 26 and socket 27 arrangement of FIGS. 1-14 which senses changes in the lateral displacement of the first unit (master 3) and wing 5 relative to each other is replaced by a strain gauge 48 which electronically operates the drive 49 to rotate the shaft 30 of the control system. If desired, the strain gauge arrangement of FIG. 15 can be used with joints such as 13 that permit the pipes 14 and 15 to physically move relative to each other along the axis of the pipes. However, it can also be used with tighter joints or attaching means such as 50 in FIG. 15 which permits very little if any lateral displacement of the pipes 14 and 15 relative to each other along their axes. With the joint 50 of FIG. 15 the strain gauge 48 measures not so much the actual lateral displacement of the pipes 14 and 15 as it does the forces tending to laterally displace the pipes 14 and 15. In any event, the strain gauge 48 in the environment of FIG. 15 with the tight joint 50 measures changes in the forces tending to laterally displace the pipes 14 and 15 and operates drive 49 in response thereto to rotate shaft 30. In this manner, the controls within the control box 33 are operated in the fashion of FIGS. 1-14 to dampen the oscillations of the wing 5 (FIG. 9) and additionally dampen the oscillations of the first unit or master 3 (FIG. 11).

While several embodiments of the present invention have been shown and described in detail, it is understood that modifications can be made to them without departing from the scope of the invention. For example, the irrigator 1 in the above examples could consist of multiple masters and multiple wings creating repeating oscillations on the fashion of FIGS. 8 and 10 in various segments of the irrigator and at various locations along the irrigator; however, the dampening feature of the present invention will still operate to dampen such oscillations in the fashion of FIGS. 9 and 11. Also the irrigator 1 could be readily adapted to operate with a wing 5 on both sides of the master 3 and the control C can be easily modified to have the lateral irrigator 1 first traverse the field 2 in one direction and then reverse its operation to traverse the field 2 in the opposite direction.

I claim:

1. In a lateral irrigator having a first unit and a wing extending outwardly therefrom in which one of said first unit and said wing advances in a first direction at a first rate of speed, said lateral irrigator having a joint means for permitting said first unit and said wing to move laterally relative to each other substantially along a reference line extending from the one of said first unit and said wing substantially perpendicular to said first direction, said lateral irrigator further having an operational mode in which the other of said first unit and said wing alternately leads and lags said reference line in an oscillating manner, the improvement comprising:
    first means for sensing changes in the lateral displacement of the first unit and wing relative to each other substantially along said reference line, and
    second means for dampening the oscillations of the other of said first unit and said wing about said reference line in response to the lateral displacement changes sensed by said first means.

2. The lateral irrigator of claim 1 wherein said lateral irrigator has a second operational mode in which the one of said first unit and said wing oscillates about a preferred line of travel in addition to the other of said first unit and said wing oscillating about said reference line, the improvement wherein said second means includes means for dampening the oscillation of said other and said one respectively about said preferred travel line and said reference line in response to the lateral displacement changes sensed by said first means.

3. The improvement of claim 1 wherein said first means includes a ball and socket arrangement, means for mounting said ball and socket on respective ones of said first unit and wing with said ball within said socket, said socket being elongated in the direction of said reference line wherein said lateral displacements of said first unit and said wing relative to each other along said reference line moves said ball and socket relative to each other along said reference line, said first means for sensing changes in the lateral displacement of the first unit and wing relative to each other including means for detecting movement of said ball and socket relative to each other along said reference line, and said second means includes means for dampening the oscillation of the other of said first unit and said wing about said reference line in response to the detecting means sensing movement of said ball and socket relative to each other along said reference line.

4. The improvement of claim 1 wherein said second means includes switch means and means for activating said switch means in response to the lateral displacement changes sensed by said first means, said second means further including means responsive to said switch means for selectively altering the speed of the other of said first unit and wing relative to said first rate of speed of the one of said first unit and wing.

5. The improvement of claim 4 wherein said switch means has at least two operating positions and said activating means includes means for placing said switch means in one of said operating positions in response to lateral displacement changes of the first unit and wing relative to each other in one direction along said reference line and means for placing said switch means in the other of said operating positions in response to lateral displacement changes in a second direction opposite to said one direction.

6. The improvement of claim 4 wherein said second means further includes a first member, means to mount said switch means to said first member, and means to mount said first member for rotation about an axis, and said activating means including a cam member and means to rotate said first member about said axis in response to the lateral displacement changes sensed by said first means whereby said switch means strikes said cam member and is activated thereby as said first member is rotated about said axis.

7. The improvement of claim 6 wherein said switch means includes two switches and said activating means includes means for rotating said first member about said axis in a first direction in response to lateral displacement changes of the first unit and wing relative to each other in one direction along said reference line to activate one of the switches and means for rotating said first member about said axis in a direction opposite to said first direction in response to lateral displacement changes in a second direction opposite to said one direction to activate the other switch.

8. The improvement of claim 4 wherein said switch means and activating means have a neutral position relative to each other in which said switch means is not activated and said second means includes means for periodically returning said switch means and activating means to said neutral position regardless of the lateral displacement position of said first unit and said wing relative to each other along said reference line.

9. The improvement of claim 1 wherein said first means includes means for sensing changes in the lateral displacement of the first unit and wing relative to each other at said joint means along said reference line.

10. The lateral irrigator of claim 1 wherein said lateral irrigator is filled with water under pressure exerting a force on said first unit and wing tending to push said first unit and wing laterally apart along said reference line at said joint means, said improvement further including means for neutralizing the force of the water pressure within the lateral irrigator tending to push the first unit and wing laterally apart at said joint means wherein said first means senses lateral displacement changes due to forces other than the force of said water pressure within said lateral irrigator tending to push the first unit and wing laterally apart.

11. The improvement of claim 10 wherein said neutralizing means includes a hollow, flexible member having first and second sides, means for mounting said flexible member with one side thereof attached to said first unit and the other side thereof attached to the wing, and means for placing the interior of the flexible member in fluid communication with the water in said lateral irrigator.

12. The improvement of claim 11 wherein said first unit and said wing include water pipes of a first cross-sectional area and each of said sides of said flexible member has a cross-sectional area substantially equal to said first area.

13. The improvement of claim 12 wherein said sides are substantially parallel to the cross sections of said pipes adjacent said joint means.

14. A method of operating a lateral irrigator having a first unit and a wing extending outwardly therefrom, said method comprising the steps of:
  (a) advancing one of said first unit and said wing in a first direction at a first rate of speed,
  (b) permitting said first unit and said wing to move laterally relative to each other substantially along a reference line extending from the one of said first unit and said wing substantially perpendicular to said first direction,
  (c) initiating a first operational mode in which the other of said first unit and wing tends to alternately lead and lag said reference line in an oscillating manner,
  (d) sensing changes in the lateral displacement of the first unit and wing relative to each other substantially along said reference line, and
  (e) dampening the oscillations initiated in step (c) in response to the lateral displacement changes sensed in step (d).

15. The method of claim 14 wherein step (c) further includes the limitation of initiating a second operational mode in which the one of said first unit and wing oscillates about a preferred line of travel in addition to the other of said first unit and wing oscillating about said reference line and step (e) further includes the limitation of dampening the oscillations of said other and said one respectively about said preferred travel line and said reference line in response to the lateral displacement changes sensed in step (d).

16. The method of claim 14 wherein step (b) further includes the limitation of permitting said first unit and said wing to move laterally relative to each other at a first location along said reference line and step (d) includes the further limitation of sensing said changes in the lateral displacement of the first unit and wing relative to each other at said first location along said reference line.

17. The method of claim 14 wherein step (b) further includes the limitation of permitting said first unit and said wing to move laterally relative to each other at a first location along said reference line, said method further includes the step of filling said lateral irrigator with water under pressure with said water exerting a force on said first unit and wing tending to push the first unit and wing laterally apart at said first location, and neutralizing the force of the water pressure within the lateral irrigator tending to push the first unit and wing laterally apart at said first location wherein step (d) senses lateral displacement changes due to forces other than the force of said water pressure within said lateral irrigator tending to push said first unit and wing laterally apart.

18. A lateral irrigator comprising:
a first unit, a wing extending outwardly therefrom, means for advancing one of said first unit and said wing in a first direction at a first rate of speed, and joint means for permitting said first unit and said wing to move laterally relative to each other substantially along a reference line extending from the one of said first unit and said wing substantially perpendicular to said first direction,
means for driving the lateral irrigator in a first operational mode in which said other of said first unit and said wing alternately leads and lags said reference line in an oscillating manner,
means for sensing changes in the lateral displacement of the first unit and wing relative to each other substantially along said reference line, and
means for dampening the oscillations of said other of said first unit and wing in response to the lateral displacement changes sensed by said sensing means.

19. The lateral irrigator of claim 18 wherein said driving means includes means for driving said lateral irrigator in a second operational mode in which the one of said first unit and wing oscillates about a preferred line of travel in addition to the other of said first unit and wing oscillating about said reference line, said dampening means further including means for dampening the oscillations of said other and said one respectively about said preferred travel line and said reference line in response to the lateral displacement changes sensed by said sensing means.

20. The lateral irrigator of claim 18 wherein said sensing means includes means for sensing changes in the lateral displacement of the first unit and wing relative to each other at said joint means along said reference line.

21. The lateral irrigator of claim 18 further including means for filling the lateral irrigator with water under pressure, said water exerting a force on said first unit and wing tending to push said first unit and wing laterally apart along said reference line at said joint means, said lateral irrigator further including means for neutralizing the force of the water pressure within the lateral irrigator tending to push the first unit and wing laterally apart at said joint means wherein said sensing means senses lateral displacement changes due to forces other than the force of said water pressure within said lateral irrigator tending to push the first unit and wing laterally apart.

22. In a lateral irrigator having a first unit and a wing extending outwardly therefrom in which one of said first unit and said wing advances in a first direction at a first rate of speed, said lateral irrigator having an operational mode in which the other of said first unit and wing alternately leads and lags a reference line extending from the one of said first unit and said wing substantially perpendicular to said first direction in an oscillating manner, the improvement comprising:

first means for sensing changes in any forces tending to laterally displace the first unit and wing relative to each other substantially along said reference line, and
second means for dampening the oscillation of the other of said first unit and said wing about said reference line in response to the force changes sensed by said first means.

23. The lateral irrigator of claim 22 wherein said lateral irrigator has a second operational mode in which the one of said first unit and said wing oscillates about a preferred line of travel in addition to the other of said first unit and said wing oscillating about said reference line, the improvement wherein said second means includes means for dampening the oscillations of said other and said one respectively about said preferred travel line and said reference line in response to the force changes sensed by said first means.

24. The lateral irrigator of claim 22 further including means for attaching said first unit and wing to each other at a first location along said reference line and said first means includes means for sensing changes in the forces tending to laterally displace the first unit and wing relative to each other at said first location along said reference line.

25. A method of operating a lateral irrigator having a first unit and a wing extending outwardly therefrom, said method comprising the steps of:
(a) advancing one of said first unit and said wing in a first direction at a first rate of speed,
(b) initiating a first operational mode in which the other of said first unit and wing tends to alternately lead and lag said reference line in an oscillating manner,
(c) sensing changes in any forces tending to laterally displace the first unit and wing relative to each other substantially along said reference line, and
(d) dampening the oscillations initiated in step (b) in response to the force changes sensed in step (c).

26. The method of claim 25 wherein step (b) further includes the limitation of initiating a second operational mode in which the one of said first unit and wing oscillates about a preferred line of travel in addition to the other of said first unit and wing oscillating about said reference line and step (d) further includes the limitation of dampening the oscillations of said other and said one respectively about said preferred travel line and said reference line in response to the lateral displacement changes sensed in step (c).

27. The method of claim 25 further including the step of attaching said first unit and wing to each other at a first location along said reference line and step (c) includes the further limitation of sensing said changes in the forces tending to laterally displace the first unit and wing relative to each other at said first location along said reference line.

28. A lateral irrigator comprising:
A first unit, a wing extending outwardly therefrom, and means for advancing one of said first unit and said wing in a first direction at a first rate of speed,
means for driving the other of first unit and said wing in an operational mode in which said other of said first unit and said wing alternately leads and lags a reference line extending from the one of said first unit and said wing substantially perpendicular to said first direction in an oscillating manner,
means for sensing changes in any forces tending to laterally displace the first unit and wing relative to each other substantially along said reference line, and means for dampening the oscillations of said driving means in response to the force changes sensed by said sensing means.

29. The lateral irrigator of claim 28 wherein said driving means includes means for driving said lateral irrigator in a second operational mode in which the one of said first unit and wing oscillates about a preferred line of travel in addition to the other of said first unit and wing oscillating about said reference line, said dampening means further including means for dampening the oscillations of said other and said one respectively about said preferred travel line and said reference line in response to the force changes sensed by said sensing means.

30. The lateral irrigator of claim 28 further including means for attaching said first unit and wing to each other at a first location along said reference line and said sensing means includes means for sensing changes in the forces tending to laterally displace the first unit and wing relative to each other at said first location along said reference line.

* * * * *